(12) United States Patent
Kawakami et al.

(10) Patent No.: US 9,132,887 B2
(45) Date of Patent: Sep. 15, 2015

(54) BICYCLE OPERATING DEVICE

(75) Inventors: Tatsuya Kawakami, Osaka (JP); Yoshimitsu Miki, Osaka (JP); Kazutaka Fukao, Osaka (JP); Takafumi Nishino, Osaka (JP)

(73) Assignee: Shimano Inc., Osaka (JP)

( * ) Notice: Subject to any disclaimer, the term of this patent is extended or adjusted under 35 U.S.C. 154(b) by 424 days.

(21) Appl. No.: 13/404,334

(22) Filed: Feb. 24, 2012

(65) Prior Publication Data

US 2013/0220058 A1     Aug. 29, 2013

(51) Int. Cl.
    *B62M 25/04*      (2006.01)

(52) U.S. Cl.
    CPC .............. *B62M 25/04* (2013.01); *Y10T 74/2042* (2015.01)

(58) Field of Classification Search
    CPC .... B62M 25/04; B62M 25/045; B62K 23/06; Y10T 74/20043; Y10T 74/20287; Y10T 74/20438
    USPC .................. 74/473.14, 488, 489, 501.6, 502.2
    See application file for complete search history.

(56) References Cited

U.S. PATENT DOCUMENTS

| | | | |
|---|---|---|---|
| 6,450,060 B1 | 9/2002 | Shahana | |
| 7,000,496 B2 | 2/2006 | Wessel et al. | |
| 7,146,874 B2 | 12/2006 | Shahana et al. | |
| 7,878,089 B2 | 2/2011 | McLaughlin et al. | |
| 2003/0126940 A1 | 7/2003 | Kawakami | |
| 2003/0221507 A1 | 12/2003 | Wessel et al. | |
| 2006/0053940 A1 | 3/2006 | McLaughlin et al. | |
| 2007/0137386 A1* | 6/2007 | Kawakami | 74/502.2 |
| 2010/0071499 A1* | 3/2010 | Weiss | 74/502.2 |

FOREIGN PATENT DOCUMENTS

| | | |
|---|---|---|
| EP | 1 134 158 B1 | 2/2006 |
| EP | 1 366 981 B1 | 1/2010 |

\* cited by examiner

*Primary Examiner* — Thomas Diaz
(74) *Attorney, Agent, or Firm* — Global IP Counselors (57) ABSTRACT

A bicycle operating device includes a control member, two user operating members, a pivoting member and a transmission. The control member is rotated by actuation of the user operating members to control a control cable. The pivoting member pivots when one of the user operating members is actuated. The transmission includes a ratchet, a positioning tooth and a maintaining tooth. The ratchet includes first teeth engaged by the positioning tooth while the pivoting member is disposed at a first position, second teeth engaged by the maintaining tooth while the pivoting member is disposed at a second position, and third teeth engaged by a pawl when the other user operating member is operated. At least one of the teeth is arranged on a periphery of the ratchet and at least one of the teeth is arranged radially inside of the periphery of the ratchet.

7 Claims, 7 Drawing Sheets

BICYCLE OPERATING DEVICE

BACKGROUND

1. Field of the Invention

This invention generally relates to a bicycle operating device. More specifically, the present invention relates to a bicycle operating device for controlling a control cable.

2. Background Information

Most bicycles are provided with a drive train having multiple gears that allows the rider to select a particular gear for a particular situation. A bicycle operating device is usually provided for the rider to manually change gears of a bicycle transmission. Many types of bicycle operating devices have been developed to control the actuation of bicycle transmissions. Such bicycle operating devices are often called shift control devices or merely shifters. The shifters often take the form of levers or cylindrical twist-grips that rotate to a different position for each gear position. The shifters typically pull and release an inner wire of a shift control cable in order to shift gears. One example of a conventional shifter for a bicycle is disclosed in U.S. Pat. No. 7,146,874 (assigned to Shimano, Inc.).

SUMMARY

One aspect is to provide a bicycle operating device that is relatively easy to use.

In view of the state of the known technology, a bicycle operating device comprises a housing, a control member, a first user operating member, a second user operating member, a pivoting member and a transmission. The control member is rotatably disposed on the housing about a rotational axis to control a control cable. The first user operating member has an operating part for rotating the control member in a first rotational direction. The second user operating member has a pawl for rotating the control member in a second rotational direction, which is opposite to the first rotational direction. The pivoting member is movably disposed on the housing for pivotal displacement between a first position and a second position about a pivot axis by the first user operating member. The transmission is operatively disposed between the pivoting member and the control member. The transmission includes a ratchet, a positioning tooth and a maintaining tooth. The ratchet includes a plurality of first teeth engaged by the positioning tooth while the pivoting member is disposed at the first position, a plurality of second teeth engaged by the maintaining tooth while the pivoting member is disposed at the second position, and a plurality of third teeth engaged by the pawl of the second user operating member in response to the second user operating member being operated. At least one of the first, second and third teeth is arranged on a periphery of the ratchet and at least one of the first, second and third teeth is arranged radially inside of the at least one of the first, second and third teeth that is arranged on the periphery of the ratchet with respect to the rotational axis of the control member.

These and other objects, features, aspects and advantages of the bicycle operating device disclosed herein will become apparent to those skilled in the art from the following detailed description, which, taken in conjunction with the annexed drawings, discloses preferred embodiments.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
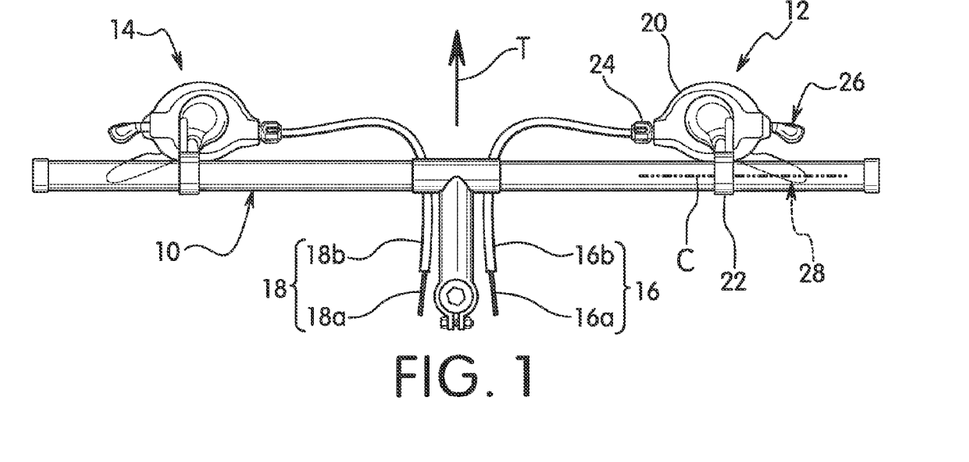
FIG. 1 is a top plan view of a bicycle handlebar that having two bicycle operating devices in the form of bicycle gear shifters in accordance with a first embodiment.

Referring initially to FIG. 1, a bicycle handlebar 10 is illustrated that is provided with a right bicycle operating device 12 and a left bicycle operating device 14 in accordance with one illustrative embodiment. The bicycle operating devices 12 and 14 are in the form of bicycle gear shifters. Thus, the bicycle operating devices 12 and 14 will be referred to hereinafter as the bicycle shifters 12 and 14.

One of the bicycle shifters 12 and 14 is operatively coupled to a rear gear changing device (not shown) via a first shift control cable 16, while the other one of the bicycle shifters 12 and 14 is operatively coupled to a front gear changing device (not shown) via a second shift control cable 18. The gear changing devices are part of a conventional bicycle driving system that is used to shift a bicycle chain for changing speeds of a drive train (not shown) in a relatively conventional manner. Thus, the gear changing devices will not be shown or described herein.

Preferably, the shift control cables 16 and 18 are conventional bicycle operating cables that have an outer case covering an inner wire. In other words, each of the shift control cables 16 and 18 is a Bowden type cable that basically includes an inner wire slidably received within an outer case. For example, as seen in FIG. 1, the shift control cable 16 has an inner wire 16a with an outer case 16b covering the inner wire 16a, while the shift control cable 18 has an inner wire 18a with an outer case 18b covering the inner wire 18a.

Also in the illustrated embodiment, the bicycle shifters 12 and 14 are essentially identical in actuation, except that they are mirror images of each other, and they may have a different number of shift actuations. In other words, the bicycle shifter 14 is identical to the bicycle shifter 12, except for the bicycle shifter 14 has been modified to be a mirror image and the number of gears that can be shifted has been changed. Thus, for the sake of brevity, only the bicycle shifter 12 will be discussed and illustrated herein.

Figure 2:
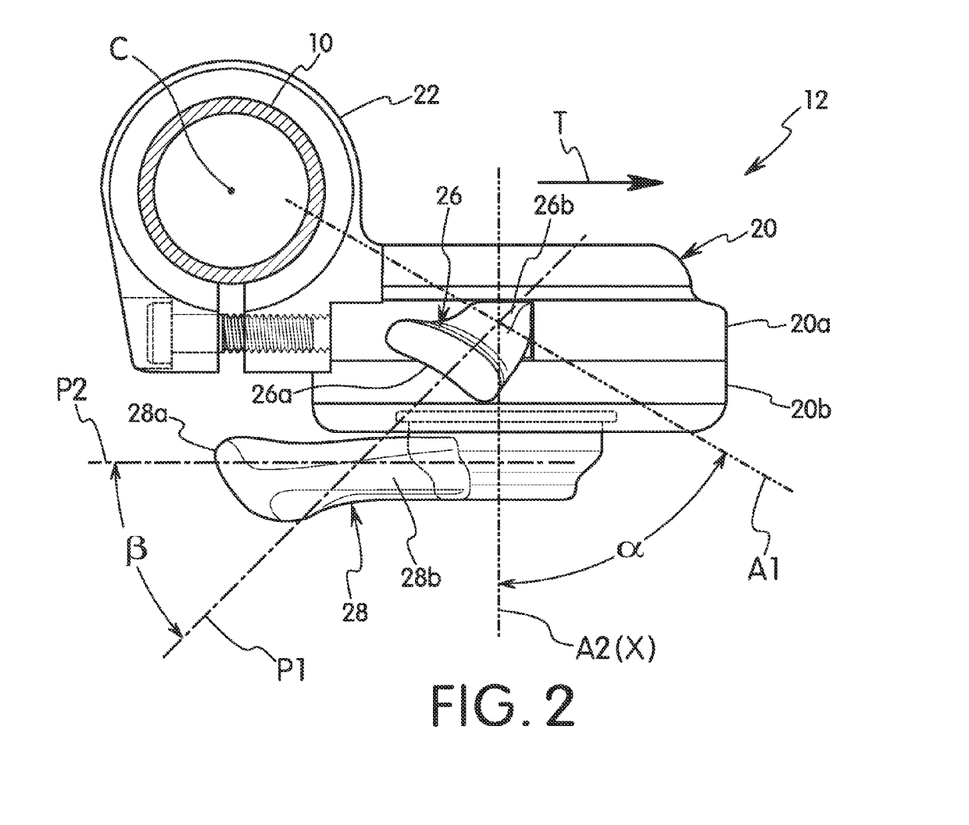
FIG. 2 is a side elevational view of the right bicycle shifter illustrated in FIG. 1 as viewed along a direction parallel to a handlebar mounting axis.

As seen in FIGS. 1 and 2, the bicycle shifter 12 includes a shifter housing 20 that houses a shifting mechanism as explained below. The housing 20 has a rigid upper shell 20a and a rigid lower shell 20b that are fastened together in a conventional manner (e.g., a snap-fit, a plurality of screws, etc.). Alternatively, the housing 20 may be constructed of several pieces. The housing 20 includes a tubular handlebar mounting clamp 22 that is configured to be mounted to the handlebar 10. In this way, the clamp 22 fixedly supports the bicycle shifter 12 on the bicycle handlebar 10. In the illustrated embodiment, the clamp 22 is integrally formed with a rigid upper shell of the housing 20. However, the clamp 22 can be a separate member that is fastened to the housing 20. The handlebar mounting clamp 22 defines a handlebar mounting axis C. As seen in FIG. 1, the housing 20 also includes a conventional cable adjustment device 24 that is threaded into the housing 20 for adjusting a relative axial position of the outer case 16b relative the inner wire 16a.

The bicycle shifter 12 further includes a first user operating member 26 that is movably mounted to the housing 20 for pivotal movement about a first operating axis A1. The motion of the first user operating member 26 defines a first motion plane P1 that is perpendicular to the first operating axis A1. The bicycle shifter 12 further includes a second user operating member 28 that is movably mounted to the housing 20 for pivotal movement about a second operating axis A2. The motion of the second user operating member 28 defines a second motion plane P2 that is perpendicular to the second operating axis A2. The first and second user operating members 26 and 28 are trigger type operating members or levers that return to a single rest position after being actuated.

Figure 3:
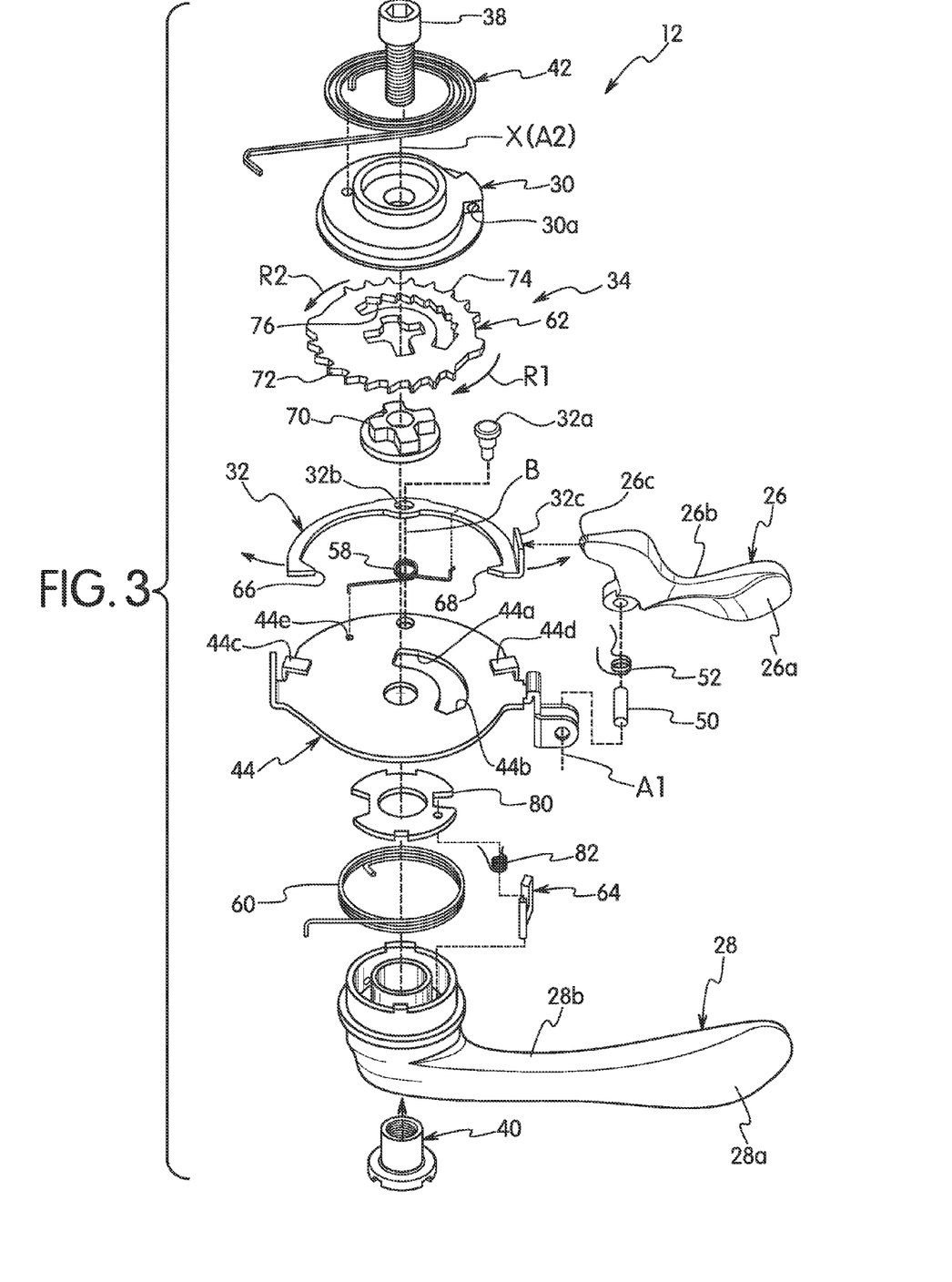
FIG. 3 is an exploded perspective view of selected parts of the right bicycle shifter illustrated in FIGS. 1 and 2.

As seen in FIG. 3, the bicycle shifter 12 further includes a control member 30, a pivoting member 32 and a transmission 34. The control member 30, the pivoting member 32 and the transmission 34 form the shifting mechanism that is all disposed within the housing 20. In the illustrated embodiment, the control member 30 rotates on the housing 20 for pulling and releasing the inner wire 16a with respect to the housing 20. The first and second user operating members 26 and 28 are operatively coupled to the control member 30 to rotate the control member 30 about a rotational axis X. In response to the actuation of either the first and second user operating members 26 and 28, the pivoting member 32 pivots about a pivot axis B to control the movement of the transmission 34 as explained below.

In the bicycle shifter 12, as seen in FIG. 3, the control member 30 is a cable spool or a wire takeup member that has a cable attachment structure 30a (e.g., an attachment opening or notch) formed at the peripheral edge of the control member 30 for directly attaching the nipple of the inner wire 16a to the control member 30. In this way, the inner wire 16a has one end attached to the control member 30. The control member 30 is rotatably mounted on a mounting bolt 38 that defines the rotational axis X. The first and second user operating members 26 and 28 are operatively coupled to the control member 30 to rotate the control member 30 about the rotational axis X.

Figure 4:
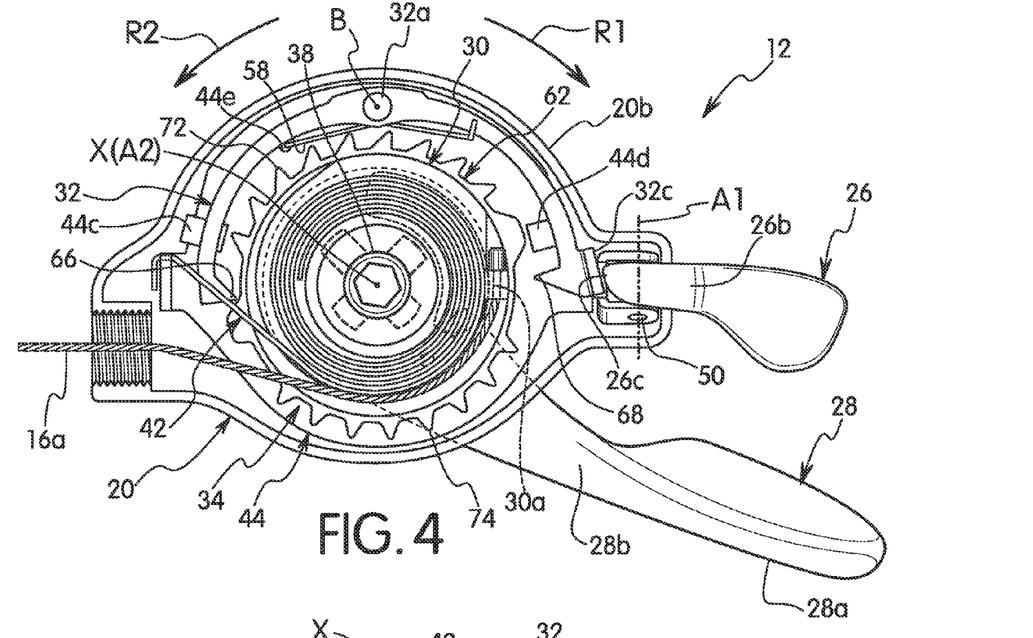
FIG. 4 is a top plan view of the right bicycle shifter illustrated in FIGS. 1 to 3, with the upper shell removed.

The actuation of the first user operating member 26 causes the control member 30 to rotate in a first rotational direction R1 (FIG. 4: clockwise as viewed looking down along the rotational axis X). On the other hand, the actuation of the second user operating member 28 causes the control member 30 to rotate in a second rotational direction R2 (FIG. 4: counterclockwise as viewed looking down along the rotational axis X). A biasing element 42 (e.g., a torsion spring) biases the control member 30 in the first rotational direction R1 on the mounting bolt 38. A nut 40 is threaded onto the mounting bolt 38 to movably mount both the second user operating member 28 and the control member 30 to the lower shell 20b of the housing 20 in a conventional manner.

With this arrangement, the rotational axis X is coincident with the second operating axis A2 of the second user operating member 28. Thus, the second operating axis A2 is coaxial with the rotational axis X such that the second user operating member 28 and the control member 30 rotate around the same axis. The bicycle shifter 12 is provided with a stationary support plate 44 that pivotally supports the first user operating member 26 relative to the housing 20. Thus, the housing 20 and the support plate 44 constitute a fixed member of the bicycle shifter 12.

Figure 9:
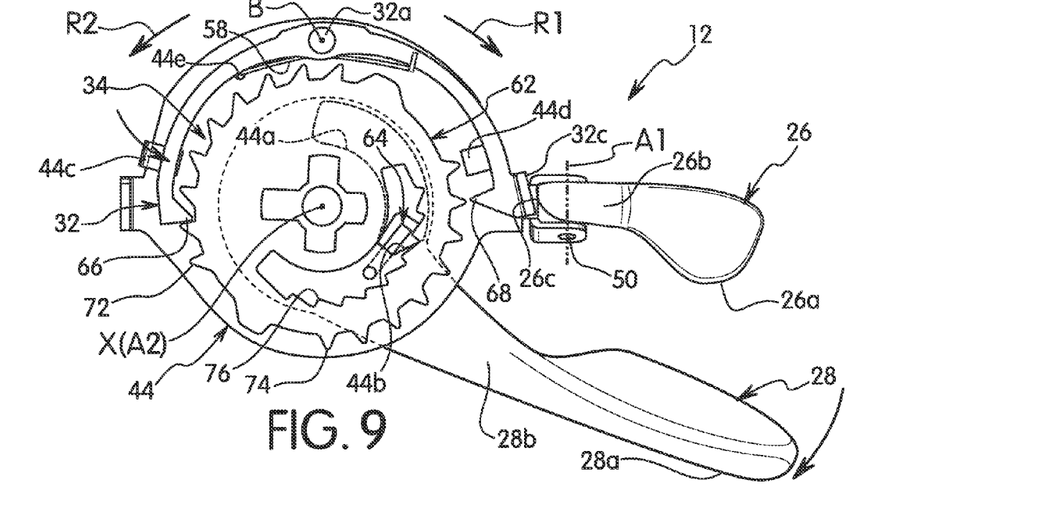
FIG. 9 is a top plan view of the selected parts of the right bicycle shifter illustrated in FIGS. 7 and 8, showing the second operating member returned to its rest position to complete the shifting (pulling) actuation that was started in FIG. 8.
Figures 10, 11, 12:
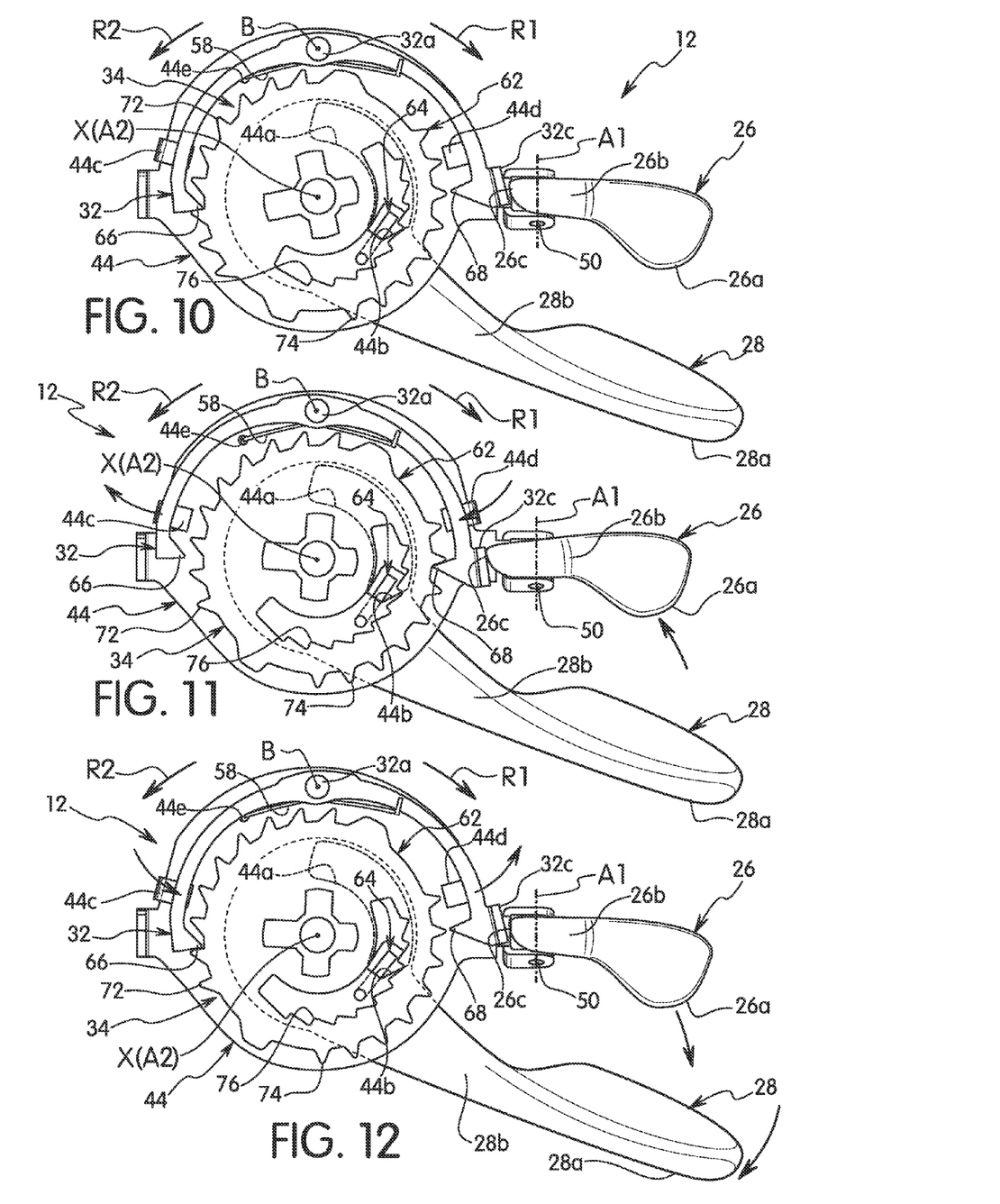
FIG. 10 is a top plan view of selected parts of the right bicycle shifter illustrated in FIGS. 1 to 3, showing the first and second operating members in their rest positions.
FIG. 11 is a top plan view of the selected parts of the right bicycle shifter illustrated in FIG. 10, showing the second operating member in the rest position and the first operating member moved to a non-rest position for performing a shifting (releasing) actuation.
FIG. 12 is a top plan view of the selected parts of the right bicycle shifter illustrated in FIGS. 10 and 11, showing the first operating member returned to its rest position to complete the shifting (releasing) actuation that was started in FIG. 11.
Figure 13:
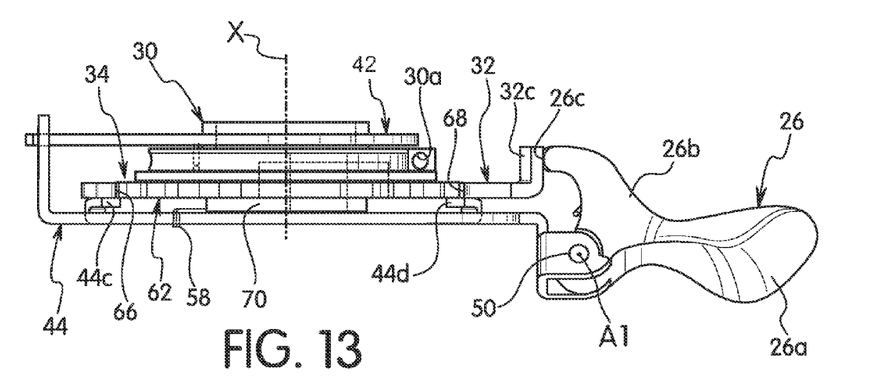
FIG. 13 is a side elevational view of selected parts of the right bicycle shifter illustrated in FIGS. 1 to 3, showing the first operating members in its rest position.
Figure 14:
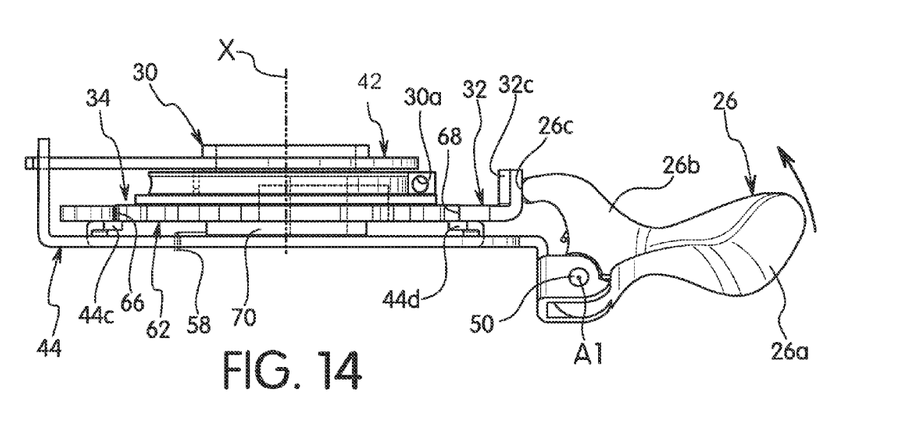
FIG. 14 is a side elevational view of the selected parts of the right bicycle shifter illustrated in FIG. 13, showing the first operating member moved to a non-rest position for performing a shifting (releasing) actuation.

In the illustrated embodiment, the first user operating member 26 pivotally attached to the stationary support plate 44 by a pivot pin 50 for movement between a rest position (FIGS. 7 to 10, 12 and 13) and an actuated position (FIGS. 11 and 14). A biasing element 52 (e.g., a torsion spring) is provided on the pivot pin 50 to bias the first user operating member 26 towards the rest position. Thus, the first user operating member 26 is a trigger lever that is biased to a rest position after being actuated. The stationary support plate 44 has an arc-shaped opening 44a with an abutment 44b such that rotational movement of the second user operating member 28 can be transmitted to the control member 30 via the transmission 34.

Referring to FIGS. 3 and 10 to 14, in the illustrated embodiment, the pivoting member 32 pivots about the pivot axis B in response to movement of the first user operating member 26 from the rest position to the actuated position. In particular, upon actuation of the first user operating member 26, the pivoting member 32 is pushed by the first user operating member 26. This pushing on the pivoting member 32 causes the pivoting member 32 to pivot about the pivot axis B from a first position or rest position to a second position or actuated position. As explained below, a shift actuation is performed by the pivotal movement of the pivoting member 32 from the first position to the second position and then back to the first position.

Figure 5:
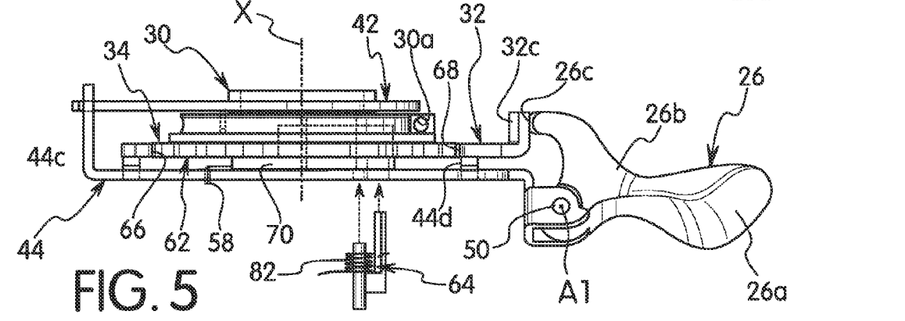
FIG. 5 is a side elevational view of selected parts of the right bicycle shifter illustrated in FIGS. 1 to 3 with a part of the pulling mechanism exploded downwardly from the transmission.
Figure 6:
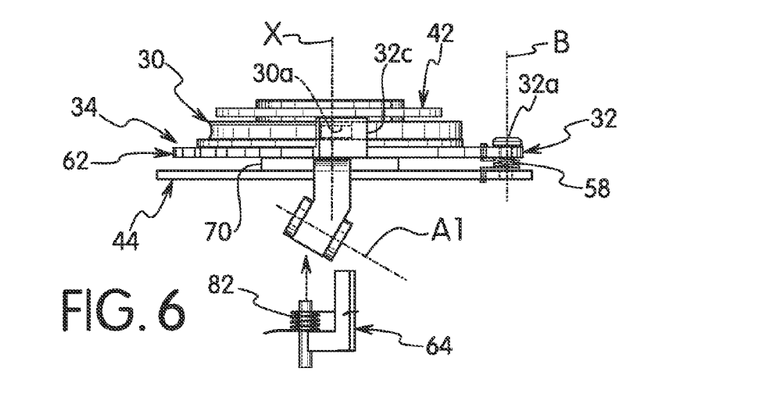
FIG. 6 is another side elevational view of selected parts of the right bicycle shifter illustrated in FIGS. 1 to 3 with a part of the pulling mechanism exploded downwardly from the transmission.

As seen in FIGS. 4 and 5, the pivoting member 32 is bias towards the first position or rest position by a biasing element 58 (e.g., a compression spring). The biasing element 58 is operatively disposed between the pivoting member 32 and the stationary support plate 44 to bias the pivoting member 32 towards the first position or rest position. It will be apparent from this disclosure that the biasing element 58 is not limited to the illustrated arrangement. Rather, a wide variety of biasing arrangements are possible for biasing the pivoting member 32 to the first position or rest position.

As seen in FIGS. 7 to 12, the pivoting member 32 is a C or U-shaped member that is mounted to the stationary support plate 44 for pivotal movement about the pivot axis B to control the movement of the transmission 34. The pivoting member 32 has a hole 32a and a mounting in 32b for pivotally mounting the pivoting member 32 on the stationary support plate 44. In particular, the mounting pin 32b is fixed to the stationary support plate 44 for defining the pivot axis B. The hole 32a has the mounting pin 32b extending therethrough and riveted thereto so the pivoting member 32 can pivot on the stationary support plate 44 about the pivot axis B. The stationary support plate 44 has two support tabs 44c and 44d for supporting the free ends of the pivoting member 32. Of course, the support tabs 44c and 44d can be eliminated if not needed, e.g., if the pivoting member 32 has an integrated sleeve portion that is disposed on the mounting pin 32b to prevent tilting of the pivoting member 32. The stationary support plate 44 also has an opening 44e for receiving a first end of the biasing element 58. The biasing element 58 has a second end that is hooked onto the pivoting member 32 to bias the pivoting member 32 towards the first position or rest position.

As best seen in FIG. 4, the inner wire 16a is fixed to the cable attachment structure 30a of the control member 30 such that the inner wire 16a can be released from the housing 20 by actuation of the first user operating member 26 or pulled into the housing 20 by actuation of the second user operating member 28. Specifically, actuation of the first user operating member 26 causes the inner wire 16a to be released, and thus unwound from the peripheral edge of the control member 30. The control member 30 rotates in the first rotational direction R1 during a cable releasing operation by the first user operating member 26. On the other hand, the inner wire 16a is pulled, and thus wound on the peripheral edge of the control member 30 by actuation of the second user operating member 28. Thus, the first user operating member 26 constitutes a release lever, while the second user operating member 28 constitutes a pull lever. The control member 30 rotates in the second rotational direction R2, which is opposite to the first rotational direction R1, during a cable pulling operation by the second user operating member 28. The second user operating member 28 is biased towards a rest position by a biasing element 60 (FIG. 3) that is operatively coupled between the housing 20 and the second user operating member 28. In the illustrated embodiments, the biasing element 60 is a torsion spring that has one end coupled to the lower shell 20b of the housing 20 and the other end coupled to the second user operating member 28. Thus, the second user operating member 28 is a trigger lever that is biased towards the rest position after being actuated.

Referring back to FIG. 2, the first operating axis A1 of the first operating member 26 is preferably tilted downward in the forward or travel direction T such that the first user operating member 26 pivots simultaneously forward and upward when actuated from its rest position to its actuated position for performing a shifting (releasing) actuation. On the other hand, preferably, the second operating axis A2 of the second user operating member 28 extends coaxially with the rotational axis X of the control member 30. Preferably, the second operating axis A2 of the second user operating member 28 is approximately vertical when installed. The first and second operating axes A1 and A2 form an angle α therebetween in the range of twenty degrees to seventy degrees such that the first and second motion planes P1 and P2 of the first and second user operating members 26 and 28 also form an angle β therebetween in the range of twenty degrees to seventy degrees. In a preferred embodiment, the first and second operating axes A1 and A2 are arranged such that the angles α and β become approximately sixty degrees as shown in FIG. 2.

The first and second user operating members 26 and 28 are preferably disposed below the handlebar 10 such that the first and second user operating members 26 and 28 include first and second user contact surfaces 26a and 28a, respectively, which are arranged to be operated by a rider's thumb. The first user contact surface 26a of the first user operating member 26 is shaped and sized differently than the second user contact surface 28a of the second user operating member 28. The second user contact surface 28a of the second user operating member 28 is preferably slightly convex whereas the first user contact surface 26a of the first user operating member 26 is slightly concave. The incline allows the thumb to deliberately slip off the contact surface, resulting in a rapid shifting operation.

The first user operating member 26 also includes a first pivot arm 26b and an operating part 26c for pushing a contact part 32c of the pivoting member 32 (FIG. 3). The first user contact surface 26a is disposed at a free end of the first pivot arm 26b of the first user operating member 26. Thus, the first user contact surface 26a is spaced from the first operating axis A1. The first user operating member 26 is preferably offset about one thumb width from the second user operating member 28 in the travel direction, and is disposed above the second user operating member 28. The first user operating member 26 pivots about the first operating axis A1 so as to move along the first motion plane P1. The first user contact surface 26a of the first user operating member 26 is disposed in front of the handlebar 10.

The second user operating member 28 includes a second pivot arm 28b. The second user contact surface 28a is disposed at a free end of the second pivot arm 28b of the second user operating member 28. Thus, the second user contact surface 28a is spaced from the second operating axis A2. As seen in FIG. 4, the second pivot arm 28b of the second user operating member 28 is longer than the first pivot arm 26b of the first user operating member 26. The second user operating member 28 pivots about the second operating axis A2 so as to move along the second motion plane P2. The second motion plane P2 is substantially in the travel direction T. The second user contact surface 28a of the second user operating member 28 is disposed approximately vertically below the handlebar mounting axis C of the clamp 22.

Referring again to FIG. 3, the transmission 34 of the shifting mechanism will now be discussed in more detail. Basically, the transmission 34 operatively couples the pivoting member 32 to the control member 30 such that selective actuation of the first and second user operating members 26 and 28 causes the inner wire 16a to be either released from the housing 20 or pulled into the housing 20. In other words, the transmission 34 controls the amount of rotation of the control member 30 so that a predetermined amount of the inner wire 16a is either released from the housing 20 or pulled into the housing 20 by operating the first and second user operating members 26 and 28. When the first user operating member 26 is actuated, the pivoting member 32 is pivotally displaced from the first position to the second position such that the transmission 34 converts the pivotal displacement of the pivoting member 32 from the first position to the second position into a rotation of the control member 30 toward the first rotational direction R1 about the rotational axis X.

As seen in FIG. 3, the transmission 34 basically includes a ratchet 62, a pull pawl 64, a positioning tooth 66 and a maintaining tooth 68. In the illustrated embodiment, the positioning tooth 66 and the maintaining tooth 68 are integrally provided on the pivoting member 32. However, the positioning tooth 66 and the maintaining tooth 68 can be separate members from the pivoting member 32 as in the last illustrated modification, which is discussed below.

The ratchet 62 is a generally a flat rigid plate or disk element that is fixed to the control member 30 to rotate with the control member 30 about the rotational axis X. In the illustrated embodiment, a securing washer 70 is used to fix the control member 30 and the ratchet 62 together. The securing washer 70 also acts as a spacer for maintaining the control member 30 in the same plane as the pivoting member 32. The securing washer 70 has a non-circular protrusion that fits into a non-circular opening in the ratchet 62 and a non-circular opening formed in the bottom of the control member 30. In this way, the control member 30 and the ratchet 62 rotate together as a unit on the mounting bolt 38 that defines the rotational axis X. Of course, it will be apparent from this disclosure that the control member 30 and the ratchet 62 can be fixed together in other ways. For example, the bottom of the control member 30 can be provided with one or more protrusions that engages the one or more corresponding openings in the ratchet 62. Alternatively, the control member 30 and the ratchet 62 could be a one-piece, unitary member.

The ratchet 62 has a plurality of first ratchet teeth 72, a plurality of second ratchet teeth 74 and a plurality of third ratchet teeth 76. The first ratchet teeth 72 are formed at a first location on the periphery (i.e., the outer peripheral edge) of the ratchet 62. The second ratchet teeth 74 are formed at a second location on the periphery of the ratchet 62. The third ratchet teeth 76 are disposed radially inside of the first and second ratchet teeth 72 and 74 with respect to the rotational axis X of the control member 30. The first, second and third ratchet teeth 72, 74, and 76 are each arranged in an arc configuration. The first, second and third ratchet teeth 72, 74, and 76 are coaxially arranged on the ratchet 62 with respect to the rotational axis X of the control member 30. The first and second ratchet teeth 72 and 74 are arranged opposite one another on the periphery of the ratchet 62. In other words, the first and second ratchet teeth 72 and 74 are arranged on opposite halves of the periphery of the ratchet 62.

Basically, the ratchet teeth 72 are selectively engaged by the positioning tooth 66 to hold the control member 30 and the ratchet 62 in a current shift position while the first and second user operating members 26 and 28 are in their rest positions. One the other hand, the second ratchet teeth 74 are selectively engaged by the maintaining tooth 68 to limited the movement amount of the control member 30 and the ratchet 62 in the first rotational direction R1 during actuation of the first user operating member 26 as seen in FIG. 11. In the illustrated embodiment, the control member 30 and the ratchet 62 can only rotate by an amount equal to the distance between two stop surfaces of two adjacent ones of the second ratchet teeth 74 as a result of actuation of the first user operating member 26. Thus, only a single shift can be performed by actuation of the first user operating member 26 in a single continuous progressive movement from the rest position. The third ratchet teeth 76 are selectively engaged by the pull pawl 64 to rotate the control member 30 and the ratchet 62 in the second rotational direction R2 against the biasing force of the biasing element 42 upon the actuation of the second user operating member 28. Multiple shifts can be performed by actuation of the second user operating member 28 in a single continuous progressive movement from the rest position based upon the amount of angular movement of the second user operating member 28.

As seen in FIG. 3, the pull pawl 64 is pivotally mounted on the second user operating member 28. Thus, the pull pawl 64 moves with the second user operating member 28 as the second user operating member 28 pivots on the second operating axis A2. In the illustrated embodiment, a mounting plate 80 is mounted to the second user operating member 28 to pivotally retain the pull pawl 64 on the second user operating member 28. In the assembled condition, the pull pawl 64 extends through an arc-shaped opening 44a in the stationary support plate 44 to engage one of the third ratchet teeth 76 upon actuation of the second user operating member 28.

The pull pawl 64 is biased by a biasing element 82 (e.g., a torsion spring) towards an engagement position in which the pull pawl 64 engages one of the third ratchet teeth 76. However, with the second user operating member 28 in the rest position, the pull pawl 64 contacts an abutment 44b formed by the arc-shaped opening 44a in the stationary support plate 44.

Figures 7, 8:
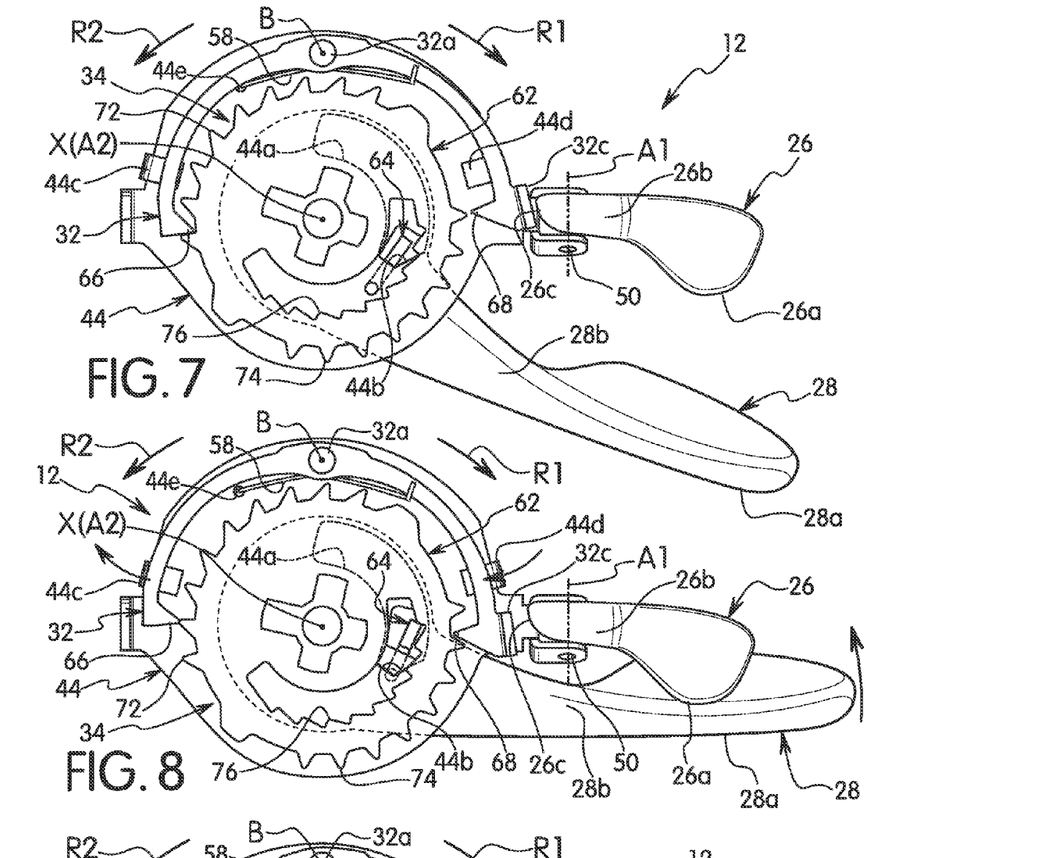
FIG. 7 is a top plan view of selected parts of the right bicycle shifter illustrated in FIGS. 1 to 3, showing the first and second operating members in their rest positions.
FIG. 8 is a top plan view of the selected parts of the right bicycle shifter illustrated in FIG. 7, showing the first operating member in the rest position and the second operating member moved to a non-rest position for performing a shifting (pulling) actuation.

In FIG. 4, the control member 30 is illustrated in a fully released position. In the fully released position, the positioning tooth 66 and the maintaining tooth 68 are both disengaged from the first and second ratchet teeth 72 and 74 of the ratchet 62. As seen in FIGS. 7 to 9, a pulling operation is performed by the actuation of the second user operating member 28 in which the pull pawl 64 engages one of the third ratchet teeth 76 of the ratchet 62 to rotate the control member 30 and the ratchet 62 in the second rotational direction R2. As the control member 30 rotates in the second rotational direction R2, the inner wire 16a wound on the peripheral edge of the control member 30, and thus pulled into the housing 20. During this rotation of the ratchet 62, as seen in FIG. 8, one of the first ratchet teeth 72 of the ratchet 62 engages the positioning tooth 66 to move the pivoting member 32 from the first position (FIG. 7) to the second position (FIG. 8) such that the positioning tooth 66 moves into engagement with the next adjacent one of the first ratchet teeth 72. In particular, each of the first ratchet teeth 72 has a cam surface that is angled to temporarily move the positioning tooth 66 out of the path of the first ratchet teeth 72. Thus, the positioning tooth 66 together with the pivoting member 32 functions as a ratchet pawl that ratchets over the first ratchet teeth 72 when the ratchet 62 rotates in the second rotational direction R2 so that the positioning tooth 66 can move into engagement with the next adjacent one of the first ratchet teeth 72. Each of the first ratchet teeth 72 also has a stop surface that is arranged to contact the positioning tooth 66 to hold the control member 30 and the ratchet 62 in a current shift position. With the illustrated embodiment, the control member 30 and the ratchet 62 can be rotated one shift position or multiple shift positions in a single continuous progressive movement of the second user operating member 28 from the rest position depending upon the amount of angular movement of the second user operating member 28.

As seen in FIGS. 10 to 12, a releasing operation is performed by the actuation of the first user operating member 26 in which the operating part 26c of the first user operating member 26 moves (i.e., pushes) the pivoting member 32 such that the pivoting member 32 pivotally moves from the first position or rest position to the second position or actuated position. This pivotal movement of the pivoting member 32 from the first position to the second position results in the positioning tooth 66 being moved out of engagement from the first ratchet teeth 72, and results in the maintaining tooth 68 moving into the path of the second ratchet teeth 74. The disengagement of the positioning tooth 66 from the first ratchet teeth 72 results in the control member 30 and the ratchet 62 being released to rotation in the first rotational direction R1 due to the biasing force of the biasing element 42. As the control member 30 rotates in the first rotational direction R1, the inner wire 16a unwound from the peripheral edge of the control member 30, and thus released from the housing 20. However, since the maintaining tooth 68 has moved into the path of the second ratchet teeth 74, one of the second ratchet teeth 74 engages the maintaining tooth 68 to stop further rotation of the control member 30 and the ratchet 62 in the first rotational direction R1 against the biasing force of the biasing element 42. Once the user releases the first user operating member 26, the first user operating member 26 returns to its rest position due to the biasing force of the biasing element 52. This return movement of the first user operating member 26 causes the pivoting member 32 to return to the first position due to the biasing force of the biasing element 58. With the pivoting member 32 in the first position (FIGS. 7, 9, 10 and 12), the positioning tooth 66 contacts one of the ratchet teeth 72. In this way, the control member 30 and the ratchet 62 are held in a current shift position. More specifically, the control member 30 and the ratchet 62 are biased against a stop surface of the currently engaged one of the first ratchet teeth 72 due to the biasing force of the biasing element 42.

Figures 15, 16, 17:
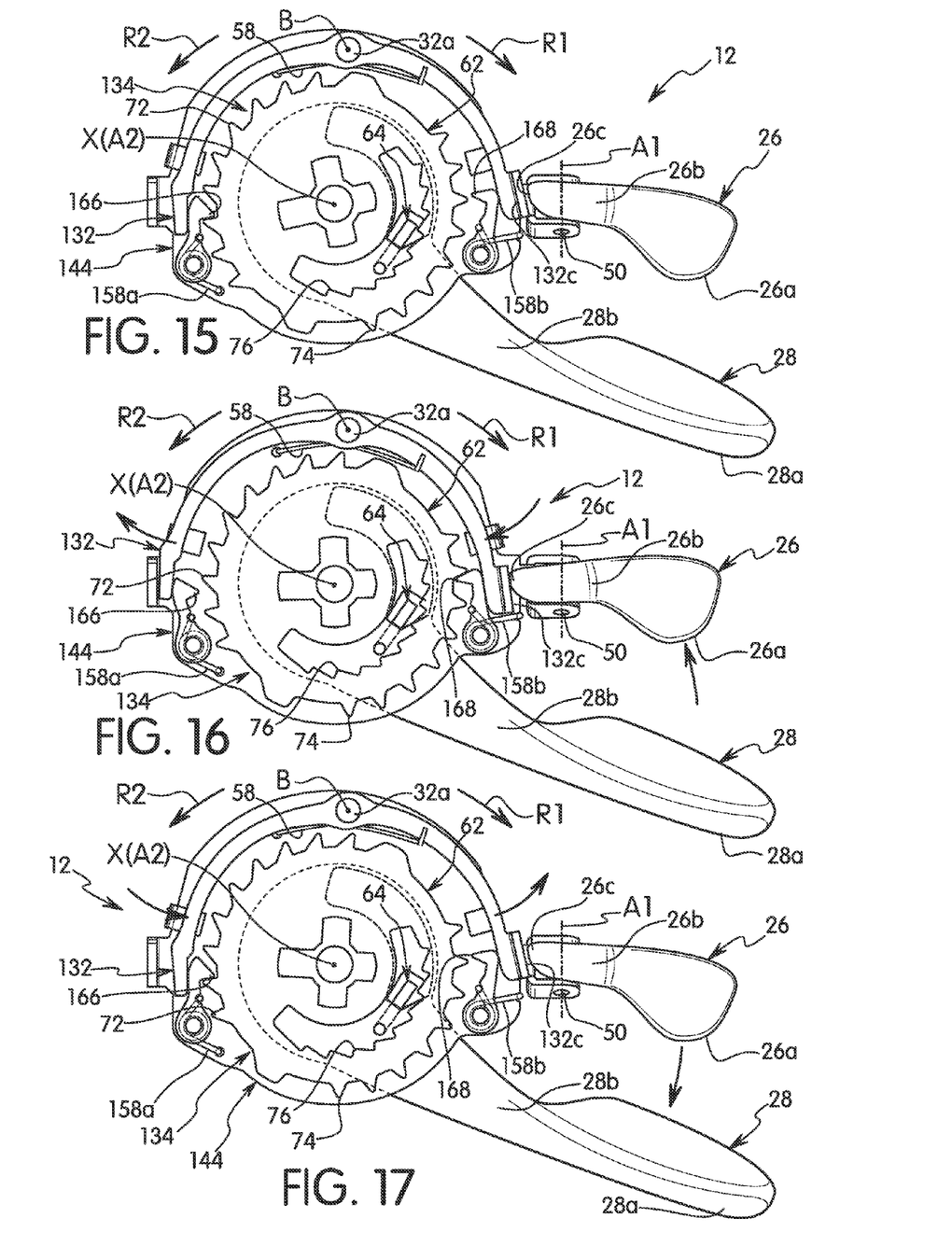
FIG. 15 is a top plan view of selected parts of the right bicycle shifter illustrated in FIGS. 1 to 3 together with a modified pivoting member, a separate positioning tooth and a separate maintaining tooth in accordance with one possible modification, and showing the first and second operating members in their rest positions.
FIG. 16 is a top plan view of the selected parts of the right bicycle shifter as illustrated in FIG. 15, and showing the second operating member in the rest position and the first operating member moved to a non-rest position for performing a shifting (releasing) actuation.
FIG. 17 is a top plan view of the selected parts of the right bicycle shifter as illustrated in FIGS. 15 and 16, showing the first operating member returned to its rest position to complete the shifting (releasing) actuation that was started in FIG. 16.

Referring now to FIGS. 15 to 17, the bicycle shifter 12 is illustrated with a modification in which the pivoting member 32 has been replaced with a modified pivoting member 132, a separate positioning tooth 166 and a separate maintaining tooth 168. To accommodate this modification, the stationary support plate 44 has been replaced with a modified stationary support plate 144 to support the pivoting member 132, the positioning tooth 166 and the maintaining tooth 168. All other parts of the bicycle shifter 12 remain unchanged in FIGS. 15 to 17.

In this modification of the bicycle shifter 12, the positioning tooth 166 and the maintaining tooth 168 are pivotally mounted to the stationary support plate 144. The pivoting member 132 moves the positioning tooth 166 and the maintaining tooth 168 in response to actuation of the first and second user operating members 26 and 28.

Thus, in this modification of the bicycle shifter 12, a transmission 134 is formed by the ratchet 62, the pull pawl 64, the positioning tooth 166 and the maintaining tooth 168. Also to accommodate this modification, the stationary support plate 144 has been provided with a pair of holes for fixedly attaching pins that pivotally support the positioning tooth 166 and the maintaining tooth 168 on the stationary support plate 144. Also, the shape of the support plate 144 has been modified and a spring end receiving hole has been added to accommodate the positioning tooth 166 and the maintaining tooth 168. Otherwise, the stationary support plate 144 is identical to the stationary support plate 44.

In this modification of the bicycle shifter 12, the biasing element 58 also biases the positioning tooth 166 towards engagement with the first ratchet teeth 72. In the case of the maintaining tooth 168, a biasing element 158b (e.g., a torsion spring) biases the maintaining tooth 168 towards a disengagement position with respect to the second ratchet teeth 74. The operations of the pivoting member 132, the positioning tooth 166 and the maintaining tooth 168 are the same as the pivoting member 32, the positioning tooth 66 and the maintaining tooth 68, which are discussed above to operate the transmission 34 for performing shifting operations. However, in this modification of the bicycle shifter 12, the pivoting member 132 moves i.e., pivots) the positioning tooth 166 and the maintaining tooth 168 in response to actuation of the first and second user operating members 26 and 28.

In this modification of the bicycle shifter 12, a biasing element 158a (e.g., a torsion spring) is operatively disposed between the stationary support plate 144 and the positioning tooth 166 to bias the positioning tooth 166 towards a disengagement position with respect to the first ratchet teeth 72. In particular, a first end of the biasing element 158a is disposed in the spring end receiving hole of the stationary support plate 144 and a second end of the biasing element 158a is hooked onto the positioning tooth 166 to bias the positioning tooth 166 towards a disengagement position with respect to the first ratchet teeth 72. In the case of the maintaining tooth 168, a biasing element 158b (e.g., a torsion spring) biases the maintaining tooth 168 towards a disengagement position with respect to the second ratchet teeth 74. In particular, a first end of the biasing element 158b is hooked onto the edge of the stationary support plate 144 and a second end of the biasing element 158b is hooked onto the maintaining tooth 168 to bias the maintaining tooth 168 towards a disengagement position with respect to the second ratchet teeth 74. Of course, the combined biasing force of the biasing elements 58 and 158b is greater than the biasing force of the biasing element 158a such that the pivoting member 132 is normally held in the first position or rest position as seen in FIGS. 15 and 16. The operations of the pivoting member 132, the positioning tooth 166 and the maintaining tooth 168 to operate the transmission 134 for performing shifting operations are the same as the pivoting member 32, the positioning tooth 66 and the maintaining tooth 68, which are discussed above. Thus, this modification of the bicycle shifter 12 will not be discussed in more detail herein.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the above embodiment(s), the following directional terms "forward", "rearward", "above", "downward", "vertical", "horizontal", "below" and "transverse" as well as any other similar directional terms refer to those directions of a bicycle equipped with the bicycle operating device. Accordingly, these terms, as utilized to describe the bicycle operating device should be interpreted relative to a bicycle equipped with the bicycle operating device as used in the normal riding position on level ground. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle operating device comprising:
   a housing;
   a control member rotatably disposed on the housing about a rotational axis to control a control cable;
   a first user operating member having an operating part for rotating the control member in a first rotational direction;
   a second user operating member having a pawl for rotating the control member in a second rotational direction, which is opposite to the first rotational direction;
   a pivoting member movably disposed on the housing for pivotal displacement between a first position and a second position about a pivot axis by the first user operating member, the pivoting member being a separate member from the first user operating member such that the pivoting member moves relative to the first user operating member as the pivoting member moves between the first and second positions; and
   a transmission operatively disposed between the pivoting member and the control member and including a ratchet, a positioning tooth and a maintaining tooth, at least one of the positioning tooth and the maintaining tooth being a separate member from the pivoting member,
   the ratchet including a single disk element having a plurality of first teeth engaged by the positioning tooth while the pivoting member is disposed at the first position, a plurality of second teeth engaged by the maintaining tooth while the pivoting member is disposed at the second position, and a plurality of third teeth engaged by the pawl of the second user operating member in response to the second user operating member being operated,
   at least one of the first, second and third teeth being arranged on a periphery of the disk element and at least one of the first, second and third teeth being arranged radially inside of the at least one of the first, second and third teeth that are arranged on the periphery of the disk element with respect to the rotational axis of the control member.

2. The bicycle operating device according to claim 1, wherein
   the first teeth are positioned at a first location on the periphery of the disk element, the second teeth are positioned at a second location on the periphery of the disk element, and the third teeth are arranged radially inside of the first and second teeth with respect to the rotational axis of the control member.

3. The bicycle operating device according to claim 1, wherein
   the disk element that is fixed to the control member such that the disk element rotates with the control member about the rotational axis in response to the first and second user operating member being selectively operated.

4. The bicycle operating device according to claim 1, wherein
   the first, second and third teeth are coaxially arranged on the disk element with respect to the rotational axis of the control member.

5. The bicycle operating device according to claim 2, wherein
   the first and second teeth are arranged opposite one another on the periphery of the disk element.

6. The bicycle operating device according to claim 1, wherein
   the first user operating member is configured to rotate about a first operating axis; and
   the second user operating member is configured to rotate about a second operating axis, the second operating axis being distinct from the first operating axis.

7. The bicycle operating device according to claim 6, wherein
   the second operating axis is coaxial with the rotational axis of the control member.

* * * * *